(12) United States Patent
Lai

(10) Patent No.: US 8,271,747 B2
(45) Date of Patent: Sep. 18, 2012

(54) MASK KEY SELECTION BASED ON DEFINED SELECTION CRITERIA

(75) Inventor: Lawrence Lai, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 715 days.

(21) Appl. No.: 12/493,424

(22) Filed: Jun. 29, 2009

(65) Prior Publication Data

US 2010/0030955 A1    Feb. 4, 2010

Related U.S. Application Data

(60) Provisional application No. 61/085,161, filed on Jul. 31, 2008.

(51) Int. Cl.
*G06F 12/00* (2006.01)
(52) U.S. Cl. .................. 711/156; 711/154; 711/153
(58) Field of Classification Search .................. 711/105, 711/153–156, 108; 713/193–194, 189, 164
See application file for complete search history.

(56) References Cited

U.S. PATENT DOCUMENTS 6,826,662 B2 * 11/2004 Suzuoki et al. ............... 711/156
6,826,663 B2    11/2004 Perego et al.

* cited by examiner

*Primary Examiner* — David Lam
(74) *Attorney, Agent, or Firm* — The Neudeck Law Firm, LLC

(57) ABSTRACT

An improved data system permits power efficient mask key write operations. A mask key selector implements criteria-based selection of mask keys for mask key write operations on blocks data. In one embodiment, a first set of mask keys is compared to data bytes of a data block that will be written to memory. The comparison culls keys from the list of candidates that match unmasked data bytes, that is, values that will be written to memory as "changed" data. A mask key is selected from the resulting set of candidates so a memory write operation consumes less power (relative to selection of other keys), or so that the operation minimizes switching noise. The selected mask key is then substituted by a controller into masked data values, and a modified data block is transmitted to memory, with the memory detecting masked data by identifying mask keys in the modified data block.

27 Claims, 8 Drawing Sheets

MASK KEY SELECTION BASED ON DEFINED SELECTION CRITERIA

CROSS-REFERENCE TO RELATED APPLICATION

This application claims the benefit of the filing date of U.S. Provisional Patent Application No. 61/085,161 filed Jul. 31, 2008, the disclosure of which is hereby incorporated herein by reference.

BACKGROUND OF THE TECHNOLOGY

In a data signaling interconnection, a transmitter with a group of drivers will send data onto channels of a bus. Each channel of the bus will be controlled by an associated driver to output one of a plurality of discrete values during each successive interval of a clock. The data from the channels of the bus is in turn received by a receiver. For example, such a data transmission may occur on a bus between a controller and a memory subsystem.

The signaling of data involved in these transfers can affect the power demands of the system. Indeed, some data signals in some systems may have a greater impact upon peak power consumption than other data signals associated with the transfer. For example, in devices that implement open-drain type input receivers, it may require more power to transmit a voltage low signal than a high signal. Similarly, in some systems, frequent bit toggling associated with data transmission can increase power requirements associated with driver switching.

Attempts have been made to minimize the power consumption as well as to reduce signaling noise in bus signaling systems, but room exists for further improvement.

BRIEF DESCRIPTION OF THE DRAWINGS

The present technology is illustrated by way of example, and not by way of limitation, in the figures of the accompanying drawings.

DETAILED DESCRIPTION

Figure 1:
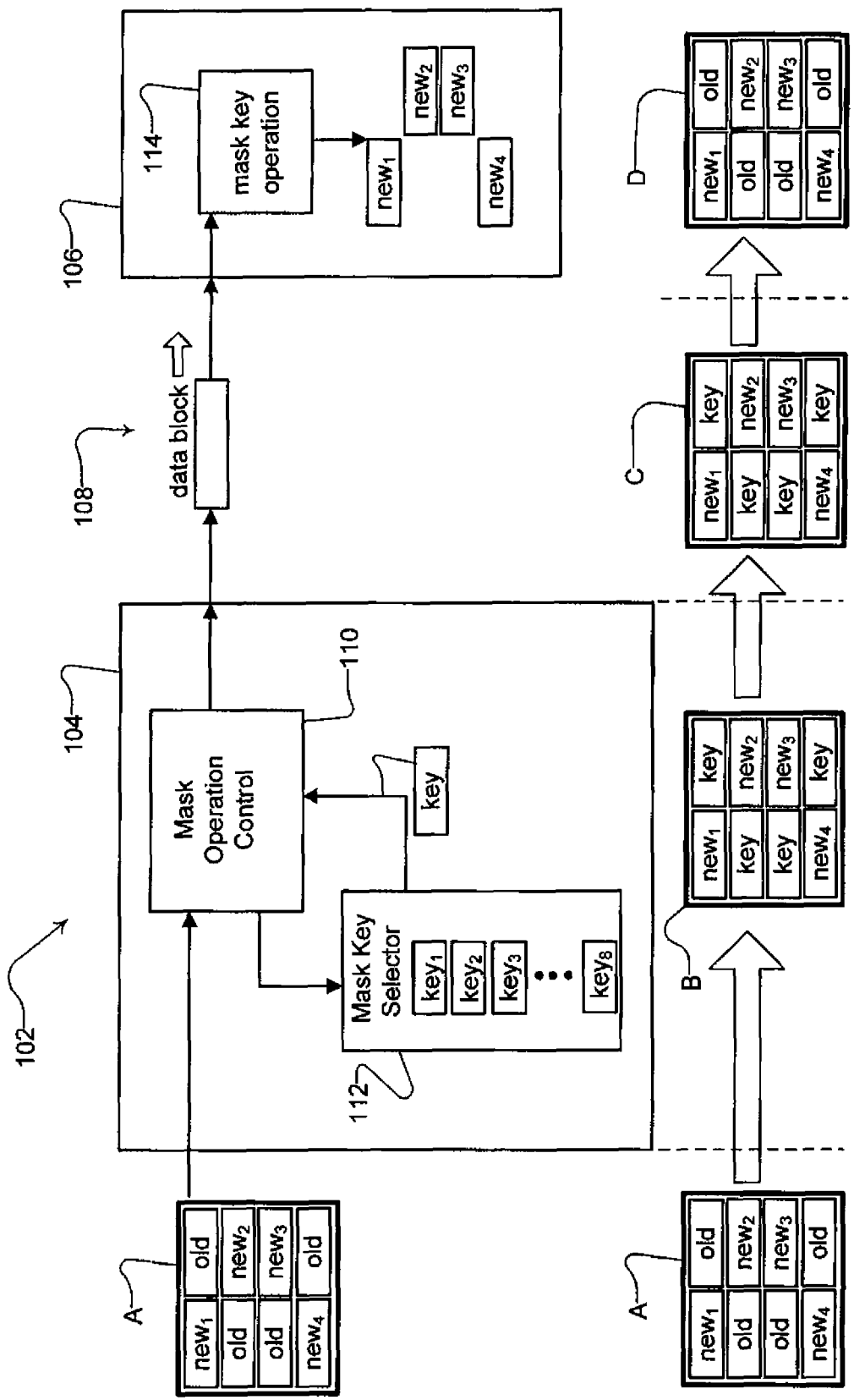
FIG. 1 is a diagram illustrating one exemplary data system that is suitable for implementing the present mask key selection technology.

FIG. 1 illustrates an embodiment of a data system 102 that utilizes intelligent mask key selection to implement a priority scheme. While a variety of different priority schemes may be selected based on implementation, as will be explained further below, the embodiment of FIG. 1 may be used to select mask keys to reduce average power or switching noise associated with a signal transmission. The data system 102 will typically include a transmitting device 104, a receiving device 106 and one or more transmission channels 108, also referred to as a "bus." The transmitting device 104 may include a plurality of drivers, each of which is dedicated to a channel of the bus 108. A suitable bus may include a number of serial or parallel channels (e.g., a 4, 8, 16, 32 or 64 bit wide bus) in addition to any control or data mask channels. The bus 108 may be formed between discrete chips or, alternatively, the bus 108 may also be formed on a single chip with the other elements of the data system 102.

As illustrated in the embodiment of FIG. 1, the transmitting device 104 may include a mask operation control element 110 and mask key selector 112. The mask operation control element 110 typically substitutes a selected mask key in to replace data values that are to be masked using keys identified by a mask key selector 112 according to one or more specific prioritization criteria.

In a mask operation, the mask operation control element 110 will selectively mask data within a group of data or "data block" (shown in FIG. 1 as block "A"). For example, each data block may be a frame of data that is to be managed (e.g. updated in memory) as a single unit, for example, in chunks of eight, thirty-two or sixty-four bytes at a time. The data block may include regular subdivisions, for example, as mentioned, of byte-sized units (i.e., eight bits). These examples are used for illustrative purposes only, e.g., a data block may be of any size, and each subdivision may be of any size, depending on specific implementation.

In the example depicted by FIG. 1, it may be assumed that the data block being transmitted by the transmitting device 104 is intended to overwrite a preexisting and corresponding data block in the receiving device 106, and that it is desired to mask select data such that the receiving device does not have to overwrite unchanged data (i.e., so that it does not have to perform a "read-modify-write" operation, where data is rewritten to memory irrespective of whether it has been changed). Modified data that will replace preexisting, different data is illustrated in FIG. 1 as "new$_1$", "new$_2$", "new$_3$" and "new$_4$," for purposes of illustration, and unmodified data that is identical to preexisting data managed by the receiving device is illustrated in FIG. 1 as "old."

Figure 2:
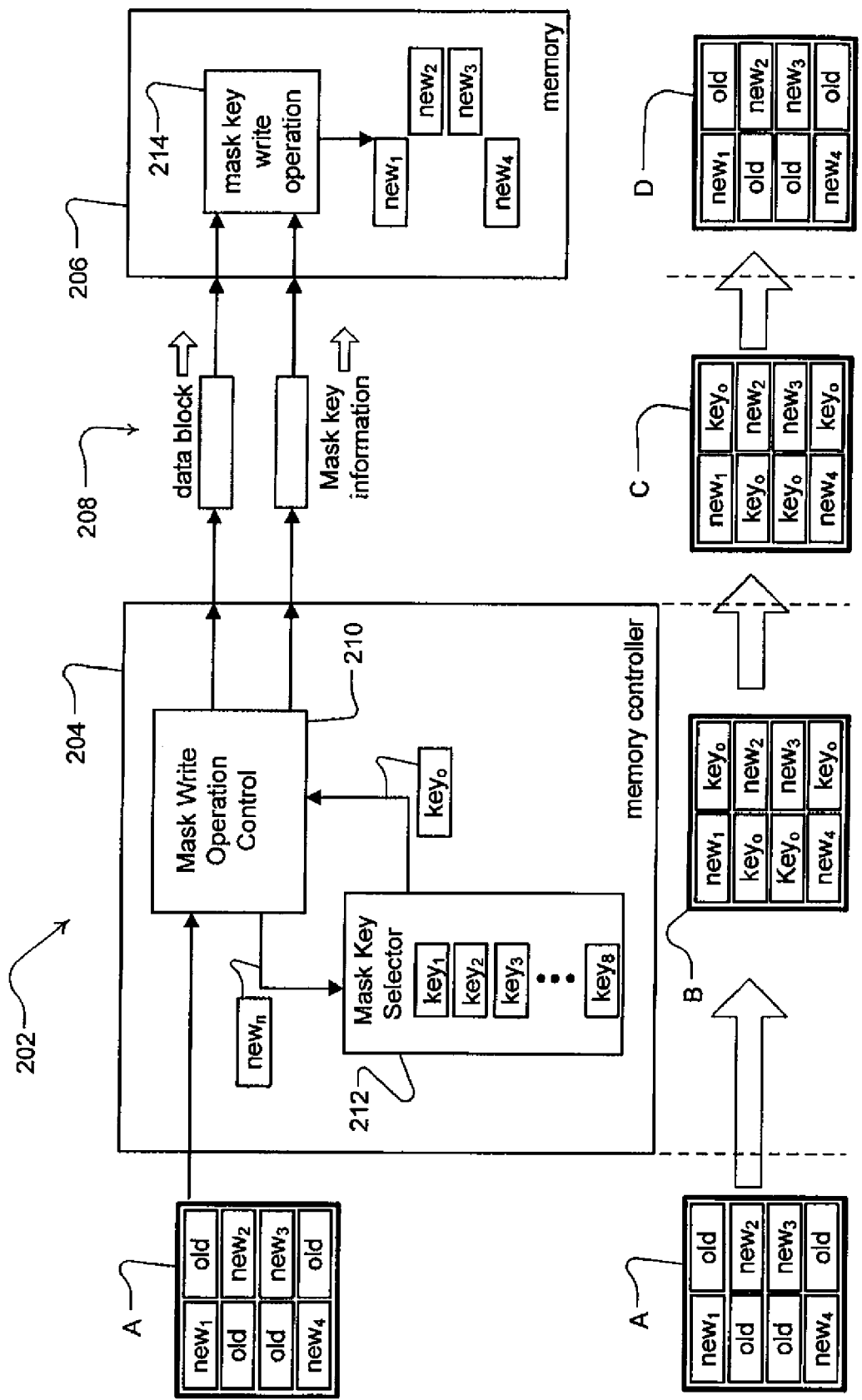
FIG. 2 is a diagram illustrating another exemplary data system that is suitable for implementing the present mask key selection technology; the embodiment of FIG. 2 differs slightly from the embodiment of FIG. 1 in that FIG. 2 calls for explicitly transmitting information identifying mask key selection to a receiver.

The mask key selector 112 selects a mask key for the mask operation from a set of candidate keys. A variety of mechanisms may be used to specify the candidate keys. For example, one embodiment (discussed below in connection with FIG. 2) uses a set of possible data values, and compares these values to the "new" data within each block of data to be transmitted (i.e., data that will be left unmasked); in this embodiment, candidate keys only include values that do not match "unmasked" (i.e., "new") data values within the data block to be transmitted to the receiving device (i.e., a candidate key is a value that may, given the key substitution scheme employed, serve as a valid key irrespective of any prioritization). This embodiment as depicted in FIG. 2 can be implemented to (a) select one mask key to replace all masked values, (b) transmit both of the mask key identity and a modified data block to the receiving device 106 (with the mask key substituted into each data that is not to be updated, i.e., that is to be masked), (c) for each group or block of data values to be transmitted. That is to say, the comparison process is performed anew for each successive data block and the mask key can vary from data block-to-data block. Another embodiment uses reserved codes as the candidate keys, where the reserved codes cannot match any unmasked data value; in such an embodiment, the receiving device 106 is able to detect a mask key based purely on its value and, consequently, mask key information may not need to be explicitly transmitted to the receiving device and no key comparison process need be implemented in a controller. For example, in a system that uses data bus inversion ("DBI"), it is possible to not invert the data bus (e.g., transmit a value that does not comport with the DBI scheme) with the receiving device interpreting mask key presence simply based on conflict with the DBI scheme. Yet another embodiment (discussed below) selects among candidates based on previous and subsequent unmasked data values within each data block to minimize switching noise; that is to say, multiple keys can be used within each data block, with selection of each key being based on previous and subsequent unmasked values in the data block. While certain specific embodiments are presented below, other key selection strategies are also possible depending upon implementation.

Whichever strategy is used to select candidates and to choose a key, one or more preferential mask keys (shown as "key" in FIG. 1) chosen by the mask key selector 112 are then supplied to the mask operation control 110. The mask operation control 110 replaces bytes of the block "A" that do not need to be updated in the memory 106 (shown as "old" in block "A" of FIG. 1, i.e., masked values) with a selected mask key as illustrated by block "B" of FIG. 1. The transmitting device 104 then transmits the block as modified (shown as block "C" in FIG. 1) with selected key(s) and the unmasked data (e.g., "new$_1$," "new$_2$," "new$_3$" and "new$_4$") to the receiving device 106.

The mask key operation element 114 of the receiving device 106 then writes or updates preexisting data with "new" data, skipping portions of the block that contain a mask key. The mask key operation element 114 may recognize masked data based merely on the value of its data, i.e., as matching something known to the receiving device to be a mask key. The result is that data in memory is updated data only with "new" data, as indicated by block "D" of FIG. 1.

FIG. 2 discusses implementation of many of these features in a memory system embodiment. It should be appreciated that it is generally desired to minimize unnecessary programming of certain types of memory that experience life-cycle wear; "flash" memory is one example of memory that experiences life cycle wear, e.g., the memory has a shorter retention time the more often it is written, with conventional "NAND" based flash having severe degradation after 100,000 or so write operations to a given location. Thus, writing only "new" data values to memory may help maximize expected lifespan of these memory devices, in addition to providing other advantages.

FIG. 2 illustrates an embodiment of a memory system 202 that utilizes intelligent mask key selection to reduce average power associated with a signal transmission. The depicted memory system 202 includes a controller 204, a data store or memory 206 and a one or more transmission channels such as a bus 208. In the embodiment of FIG. 2, the controller uses "unmasked" data values (i.e., values that are not to be masked) to select a set of candidate keys that do not match any valid data value in the data block, and it then both selects a preferred key from this candidate set and communicates the identity of this key to the memory 206. Because the preferred key does not match any valid data values, the memory 206 may ferret out masked data simply by identifying those data values that match the communicated (preferred) mask key.

The controller 204, such as a memory controller, typically transmits and receives data on the channels or signal paths of the bus 208 in write operations or read operations with a storage subsystem or memory 206. For example, the controller 204 may include a plurality of transmitters or signal drivers (not shown in FIG. 2). Each signal driver may transmit a data signal on a path or channel of the bus 208 for a write operation. It will be understood that the controller 204 may employ other elements for memory controller operations and data transmission with the bus or signal transmission interconnection such as receivers for bi-directional communication over the bus, transmit equalizers, receiver equalizers, clock generation circuit elements such as oscillators, phase lock loops, delay lock loops, phase mixers, etc. Such elements have not been shown in FIG. 2 so as to more readily illustrate some aspects of the present technology. Similarly, the bus 208 may be configured for operation in a serial, parallel, or both serial and parallel manner (for example, a bus 16 bits wide may use 4 serial transmission cycles to transmit 64 bits of data), and may be implemented as a wired, wireless, multidrop, point-to-point, single-ended, differential, or other form of interconnection.

As illustrated in the embodiment of FIG. 2, a mask write operation control element 210 may be used to control mask write operations by the controller, with a receiver-based mask key write operation element 214 used to identify masked data values in the memory 206. In such an operation, the mask write operation control 210 updates a data block (shown in FIG. 2 as block "A"), such as a block of data, to replace masked data with one or more mask keys, do create a modified data block (labeled "B" in FIG. 2). For purposes of explanation only, the block of data may consist of 8, 32 or 64 bytes, with each byte being a subdivision that is to be selectively replaced (as appropriate) with a mask key.

A mask key is selected by the mask key selector 212, from a set of candidate keys, which in turn may be based on information concerning based on unmasked data values with the data block (e.g., data block "A"). For example, mask key selector 212 may be supplied with a byte-by-byte indication of whether individual bytes within the data block are to be masked. The information may be generated by control logic that tracks or monitors which bytes within the data block have been modified since the block was read out of memory. Based on the bytes that need to be written to memory (i.e., unmasked data) the mask key selector 212 of FIG. 2 may cull values from the predetermined set of keys (e.g., that match unmasked data, and so that may not serve as keys for the given data block) to identify a set of valid candidate keys; from this set of candidates, it may select one or more of those keys in a manner that will enhance the data transmission on the bus 208 to the memory 206. To this end, a preferred mask key will be chosen according to predetermined selection criteria. For example, the mask key selector may select a mask key from a group of candidates that will minimize power consumption (relative to other mask keys) or that will minimize average switching noise (again, when compared with other candidate mask keys). Other criteria-based selections may also be implemented other than based on energy or power.

A selected mask key (shown as "$key_o$" in FIG. 2) is then supplied to the mask write operation control 210 and used in a manner described above in connection with FIG. 1. The mask write operation control 210 replaces each bytes to be masked within the data block (shown as "old" in block "A" of FIG. 2) with the selected key to produce a modified block, identified as block "B" at the bottom of FIG. 2. This block is then transmitted to memory as block "C"; in the embodiment of FIG. 2, this transmission may also be accompanied by a transmission to memory of the selected mask key (e.g., via a sideband link, data mask channel, a data bus transfer, or another transfer means). As with the example above, unmasked data is represented in FIG. 2 by the designation "$new_1$," "$new_2$," "$new_3$" and "$new_4$," and masked data is represented by a key value (e.g., $key_o$).

The data block received by memory, indicated as block "D" in FIG. 2, is then processed by the memory's mask key write operation element 214 to write unmasked "new" data into storage, skipping each byte within the modified block that contains a mask key. The result is a block of data in memory with the updated data written to the memory (e.g. "new" data) and the "old" data not being written in the write operation because the "old" data is already stored and did not need to be updated by the write operation.

Optionally, the controller 204 and memory 206 may also include encoders and decoders (not shown in FIG. 2) that implement an encoding scheme for normal data transmission. For example, in yet another embodiment, such circuit elements can permit the data system to implement a data bus inversion ("DBI") scheme. Other encoding schemes may also be used without limitation. In addition to these embodiments, or as a complement to them, as will be illustrated further below, mask key selection may also be based on "reserved" or "impossible" codes based on any underlying bus encoding scheme.

For example, if a DBI scheme is used, 9 bits of a parallel bus will be used to transmit 8 bits of information (e.g., there are 512 possible values used to transmit at most 256 data values); this in turn leaves 256 values that will never be seen in actual data transmission. For example, if a purpose of DBI in a given implementation is to minimize the number of "zero" bits, then any time more zeros than ones are present in a data value, the data bus (and the ninth, "DBI" line) may be inverted, to inform the receiving device (i.e., the memory) of the inversion; in such a scheme, no more than four zeros would ever represent data on the nine-line bus. With such a scheme, there are 256 values of the nine line bus (i.e., with more than four zeros) that would not represent valid data values, and it could simply be understood that any one of these "impossible values" could represent a mask key. In the context of such a system, a priority scheme may be applied to select from this set of "candidate" mask keys one or more preferential mask keys; for example, if it is wished to minimize the number of zeros in any transmission, several keys may satisfy this criteria (e.g., those having exactly five zeros, i.e., the minimum zeros possible for a mask key in this hypothetical). Other criteria may also be applied for narrowing the choice of mask key—for example, if it is desired to further minimize switching noise in such an embodiment, the subset of candidates having five zeroes could be prioritized so as to yield keys that minimize the number of bit transitions between last valid data (i.e., unmasked data) and next valid data. Mask key selection in a manner that minimizes switching noise will be further discussed below, in connection with FIGS. 5 and 6.

Figure 3:
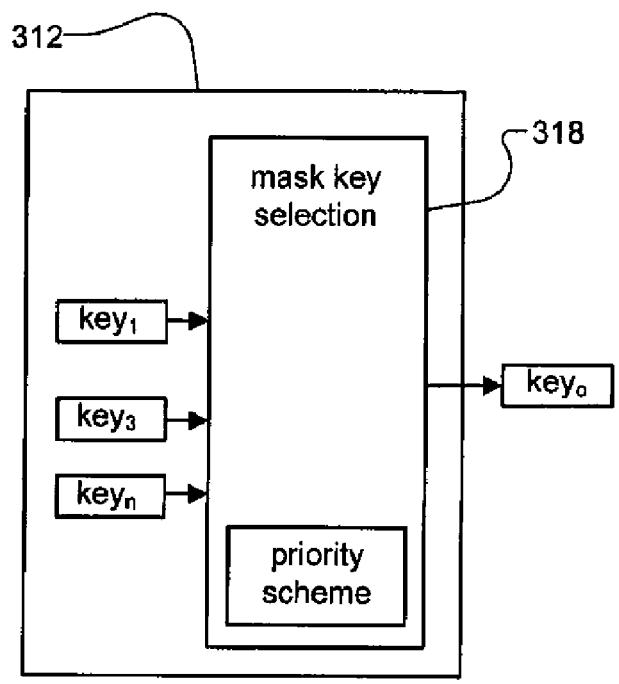
FIG. 3 is a block diagram illustrating one embodiment of mask key selection where a mask key is selected from a group of candidate keys according to a priority scheme.

As seen in FIG. 3, these embodiments all represent a situation where a set of candidate keys are processed according to a priority scheme in order to select one or more mask keys that will be used in a mask key operation. Such an operation may be performed by a controller 312, having appropriate selection logic (e.g., hardware, firmware or software), represented by numeral 318.

Figure 4:
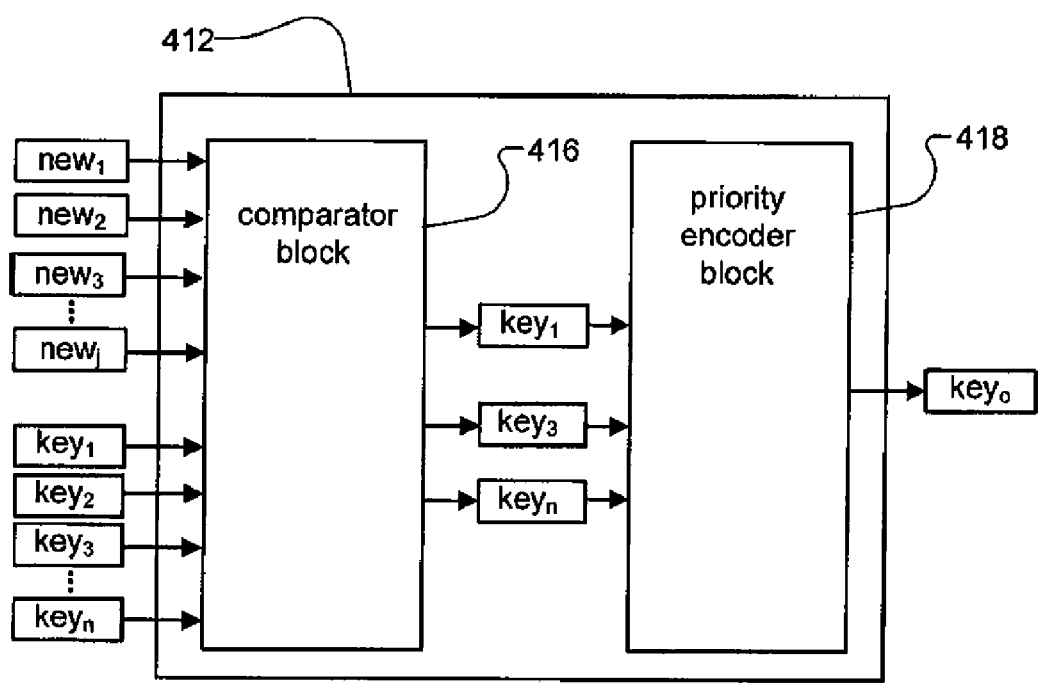
FIG. 4 is a block diagram illustrating an embodiment of a mask key selector; unlike the embodiment of FIG. 3, FIG. 4 calls for first identifying a set of candidates keys based on comparison with unmasked data values from a block of data to be transmitted.

FIG. 4 illustrates a block diagram of an embodiment where a mask key selector 412 is used to pare down data values so as to identify those data values that will not match any data value appearing in the data block and to use these as the set of candidate keys. As explained above, a set of candidate keys identified in this manner may then be prioritized according to selection criteria to choose one or more keys for actual use with the data, and a selected mask key then may be used to encode the data block and communicated to memory for use in a decoding operation.

In the embodiment of FIG. 4, the selector may be implemented with a comparator block 416 and priority encoder block 418. In the comparator block 416, the data of the block of data to be updated or written during the mask write process (shown in FIG. 4 as "$new_1$", $new_2$", "$new_3$", . . . "$new_j$") is compared to a group of possible data values (shown in FIG. 4 as "$key_1$", "$key_2$", "$key_3$", . . . "$key_n$"). If desired, these data values may be the full range of possible data values (e.g., 256 values in connection with an eight bit data bus), or they may simply be a predetermined limited set of values (e.g., 8 values) for use in key operations of the controller 412. In this operation, a first decision is made by the circuit to eliminate or disqualify values that can not serve as candidate mask keys. This is because in this embodiment, if a mask key were to match any of the data-to-updated in a block, that data upon receipt by memory could be interpreted as a mask key instead of as data to be written to the memory.

Other embodiments also exist that only consider a limited set of data values for possible use as a mask key. For example, for a data block having 32 bytes, a sufficient set may include 32 distinct values. If all 32 distinct values were disqualified because they are present in the block of data (i.e., each byte of the 32 bytes matches exactly a unique one of the 32 values), the memory controller could simply perform a non-mask key write operation and update all 32 bytes in the write operation to memory; such an embodiment presents an advantage in that the mask key selection logic is substantially reduced.

Still further embodiments also exist, e.g., a set of four predetermined values may be applied to a 32 byte system, with the controller simply updating all thirty two bytes of a data block (i.e., via a read-modify-write operation for the entire data block) if all four values were duplicated by valid, unmasked data values.

Irrespective of the particular scheme used, in an embodiment where data values are analyzed and eliminated based on duplication with data that is not to be masked, the output of the comparator block 416 may be a set of signals that indicate whether particular values should be disqualified for the mask write operation. For example, such an output signal may be a high signal dedicated to each one of a set of predetermined values to indicate whether the particular value has been disqualified. The comparator block 416 may be implemented with circuit elements such as logic gates and/or digital comparators to perform these comparisons, and the output of the comparator block 416 can be a set of candidate keys that exclude the disqualified values. This set of candidate keys may, in certain embodiments, be a subset of all values that could potentially be used as a mask key given the encoding scheme and may include multiple, alternative good mask key choices. Signals associated with this set of candidate keys can then be input to the priority encoder 418, so that a preferential mask key may be chosen according to a predetermined, hard-wired scheme.

As indicated further above, in the embodiment of FIG. 4, the priority encoder 418 may chose a mask key from the candidate set according to one or more predetermined criteria; for example, the priority encoder may instantiate a prioritization scheme that selects a mask key that results in minimum power consumption, relative to other mask keys, or that minimizes the number of bits that will be switched (with respect to either the group of data values as a whole, or with respect to an preceding or succeeding data value).

By way of example, a predetermined set of values may be preset with a priority or otherwise ranked or ordered based on the desired power transfer characteristic (e.g., "$key_1$"<"$key_2$"<"$key_3$"<"$key_4$"<"$key_5$"<"$key_6$"<"$key_7$" < . . . <"$key_n$"). Thus, the subsequent set of candidate keys may be selected based on the preset priority or ordering.

If power minimization is desired as part of the selection criteria (e.g., in an open drain system), mask keys may be selected to reduce the number of low signals (e.g., "0" bits) presented in the mask keys. In a system using, for example, a byte-sized mask key and 32 byte block operations, a mask key of "1111_1111" may have a higher priority, and thus present a more desirable selection, than a mask key of "1111_1110" or "0111_1111". A suitable embodiment of such as system may prioritize keys as follows: {1111_1111, 1111_1110, 1111_1101, 1111_1011, 1111_0111, 1110_1111, 1101_1111, 1011_1111, 0111_1111, 1111_1100, 1111_1010, 1111_0110, 1110_1110, 1101_1110, 1011_1110, 0111_1110, 1111_1001, 1111_0101, 1110_1101, 1101_1101, 1011_1101, 0111_1101, 1111_0011, 1110_1011, 1101_1011, 1011_1011, 0111_1011, 1111_0111, 1110_0111, 1101_0111, 1011_0111, 0111_0111, 1100_1111}. This listing is merely an example prioritization of an exemplary number of mask keys. Still other prioritizations are possible for such a system and may further depend on the particular system design. For example, a first set of mask keys may also be preset with a prioritization to select mask keys having minimal data toggling (i.e., "1" to "0" or "0" to "1") in the mask keys (e.g., "0000_1111" is more desirable than "0101_0101").

Figure 5:
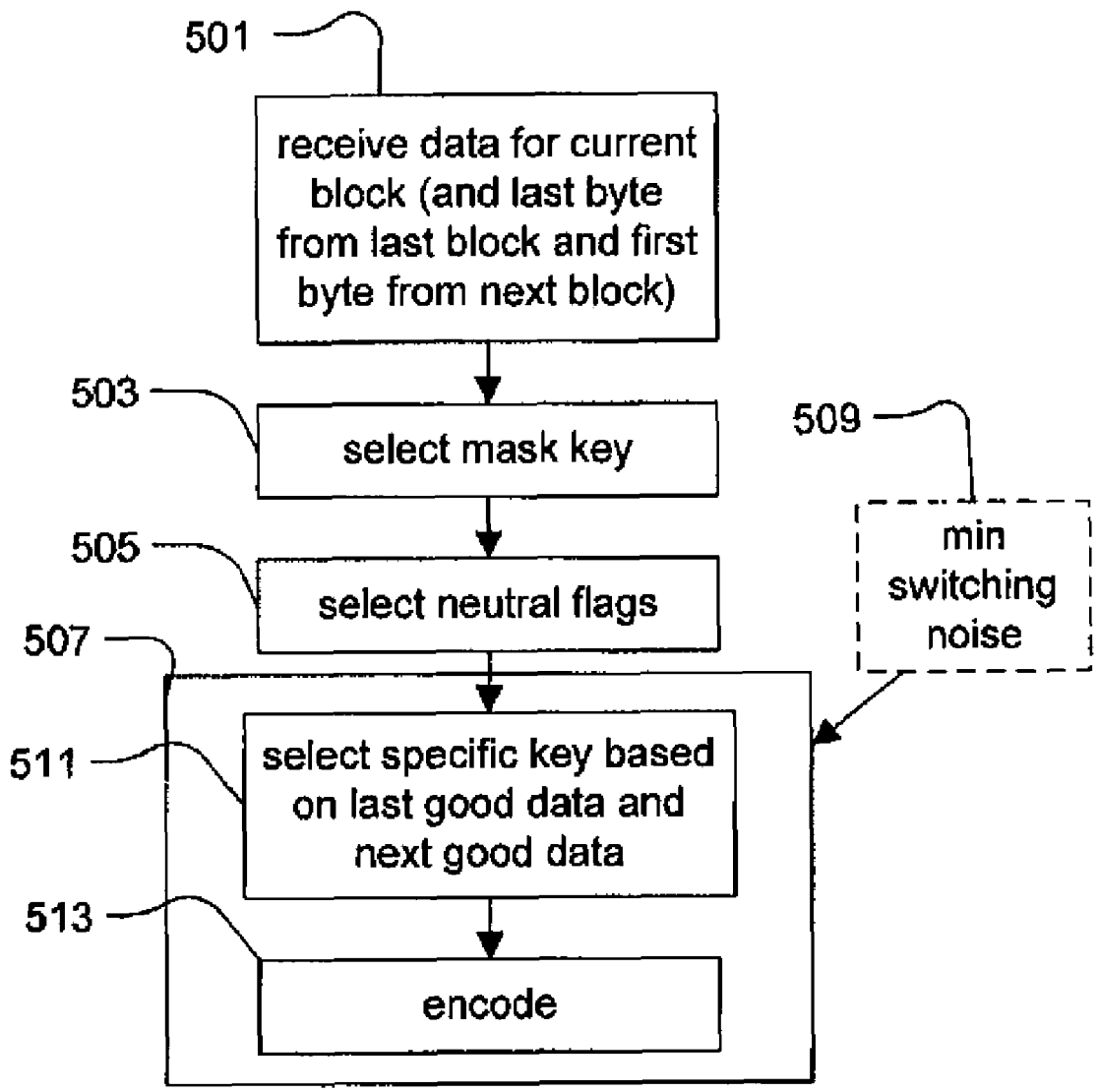
FIG. 5 is a block diagram of yet another embodiment of mask key selection, where mask key prioritization is performed to minimize switching noise associated with transmission of data values.
Figure 6:
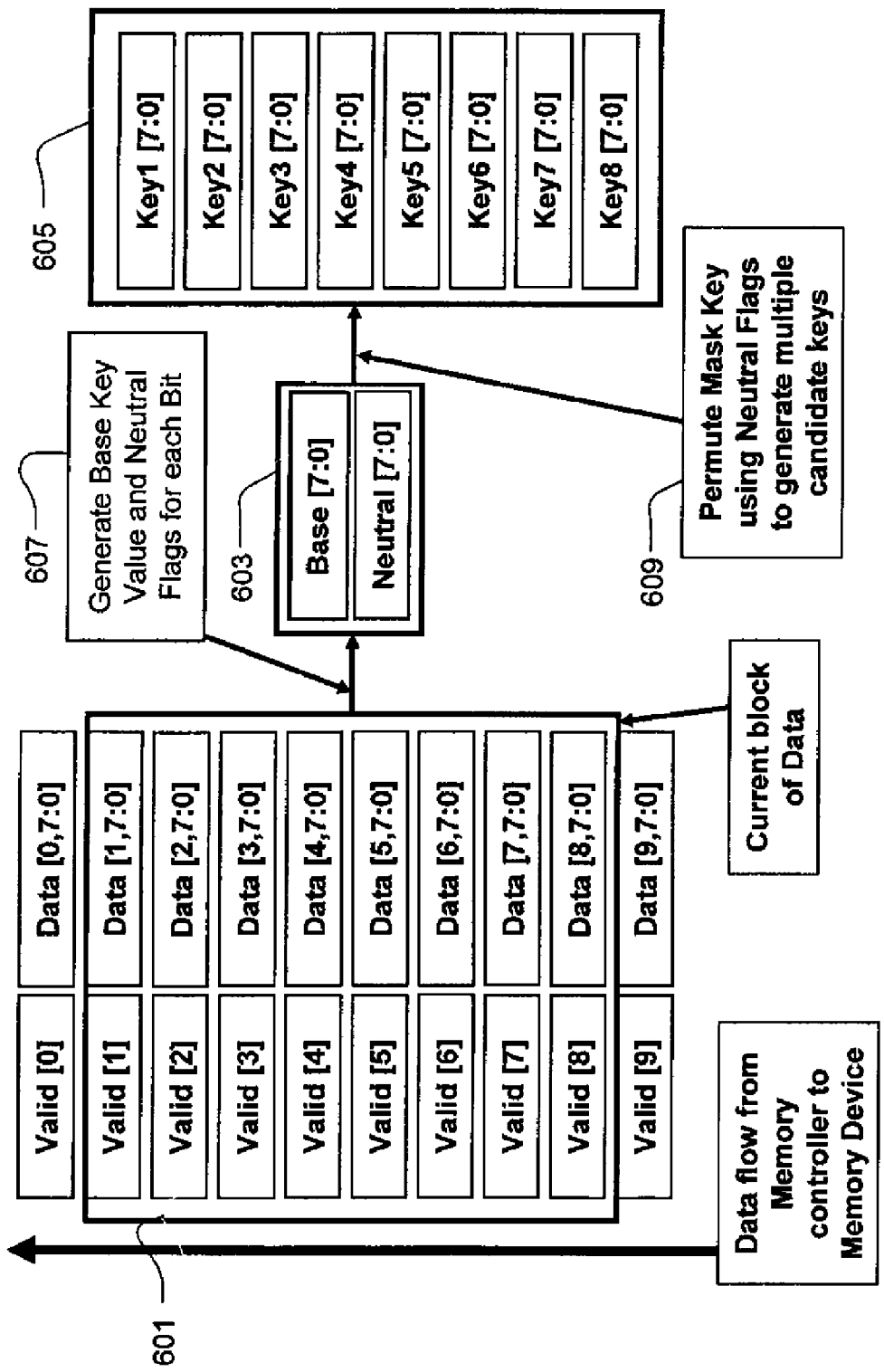
FIG. 6 is a block diagram that shows generation of a set of candidate keys in an embodiment where the candidate keys will be selected to minimize switching noise; in the embodiment of FIG. 6, a write mask operation element will derive a base key and a set of neutral flags from which individual keys will be selected and used in a write mask operation.

FIGS. 5 and 6 are used to explain an embodiment where mask keys may be selected to minimize switching noise associated with driver data toggling. Notably, in such a system, a separate set of candidate keys may be selected for each data block (e.g., such as an eight, thirty-two or sixty-four byte data block) provided the receiving device (e.g., the memory) is capable of discriminating mask keys from data. FIGS. 5 and 6 relate to an embodiment where a base mask key is selected (using a prioritization scheme, as discussed above) and where "neutral flags" are derived to effectively describe a set of candidate keys for the particular data block.

FIG. 5 sets forth one implementation of such a system. In particular, data values for a current data block are received by a mask operation control element in a transmitter, as indicated by numeral 501. In fact, the mask operation control element also receives the last byte from the immediately previous data block, as well as the first byte from the immediately subsequent data block; these values are used should either the first or last byte of a data block under consideration involve masked data. Because each byte represents one element of a sequence, the last byte of the previous data block will be sequential with the first byte of the current data block, the last byte of the current data block with be sequential with the first byte of the next data block, and so forth; employing abutting bytes of sequential data blocks helps minimize switching noise notwithstanding the use of a separate set of candidate keys for each data block, e.g., to harmonize the first "unmasked" byte of a current data block with the last unmasked byte in the sequence (i.e., the prior transmission in the sequence). Then, as indicated by numeral 503, a base value is selected for generating a mask key. Such a value may, for example, be identified by a mask key selector simply by picking one a value which is closest to the average value of unmasked data values in a given block, which also does not match any unmasked data values in the data block. Next, as indicated by numeral 505, the mask key selector selects "neutral flags" representing those permutations of the base value that also represent valid keys that are appropriate mask key candidates. Neutral flags may be computed by, for example, changing each bit of the base value, one at a time, and determining whether, when so altered, the modified value overlaps with any unmasked value in the data block; if the modified value is not replicated in the data block, then the modified bit may be regarded as a neutral bit.

With a set of candidate mask keys thus selected, one or more mask keys may then be used by the mask operation control element to replace masked data in the data block under consideration, as indicated by box 507; in this regard, the mask operation control element uses a priority scheme 509 (in this case, selection of mask key from among candidates to minimize switching noise) and operates upon a last and next unmasked data, within each block 511. The mask key selector picks one key from the set of candidates for use as a mask key and it substitutes this value in the stead of data that is to be masked. For example, the mask key that is preferentially selected may be the one of the candidates that has the most bits in common with both of the last and next good data; in a system where the last good data is 0000_1010 and the next good data is 0001_1110, for example, a suitable mask key (if present among the set of candidates) might be either 0001_1010 or 0000_1110. Using a prioritization scheme as discussed above, the mask key selector picks the highest priority mask key available. The mask operation control element then transmits this value to the memory device, as indicated by numeral 513.

FIG. 6 provides more detail on such a system; in particular, numeral 601 shows one data block (8 bytes in length) that is to be transmitted as part of a stream of data blocks. A base value, one byte in length, and an eight bit identification of neutral flags, are generated to represent candidate keys (as denoted by blocks 603, 605, and 607). The neutral flag field represents permutations of the base key that also represent valid candidate keys, as denote by numeral 609. If desired, the base value and neutral flag byte may be transmitted to a memory device, which correspondingly uses these values to identify the set of candidate keys. Exemplifying this process, if the base key was 0000_1110, and the neutral flag field was 1111_0010, this field might indicate that five additional candidate keys exist besides the base key, e.g., 1000_1110, 0100_1110, 0010_1110, 0001_1110, and 0000_1100. Logic in the memory would be configured to recognize the presence of any of these values in the associated data block as a masked data value that need not be written to memory. With the candidate set thus identified, mask key selection logic can then select a particular one of the keys that minimizes switching noise relative to last and next unmasked data, for example, by picking a mask key closest to the midpoint of these values (in terms of having fewest bit transitions). Similarly, with knowledge as to the set of mask keys, memory can identify masked values simply by detecting the presence of any mask key, even though multiple keys might be used for a given data block.

Of course, the specific example used above to illustrate (a) use of multiple mask keys per data block, or (b) prioritized use of mask keys to minimize switching noise, is exemplary only, and other implementations also exist. For example, in an embodiment where a base value is selected in a different manner (e.g., not using averaging unmasked data values), a "do not care" index may be used to represent the field of candidate keys—in such an embodiment, a mask key would be interpreted to be any value that matched the a subset of bits of the base value. Other implementations also exist. These techniques may be used by themselves, or combined with other techniques, including those discussed herein.

Figure 7A:
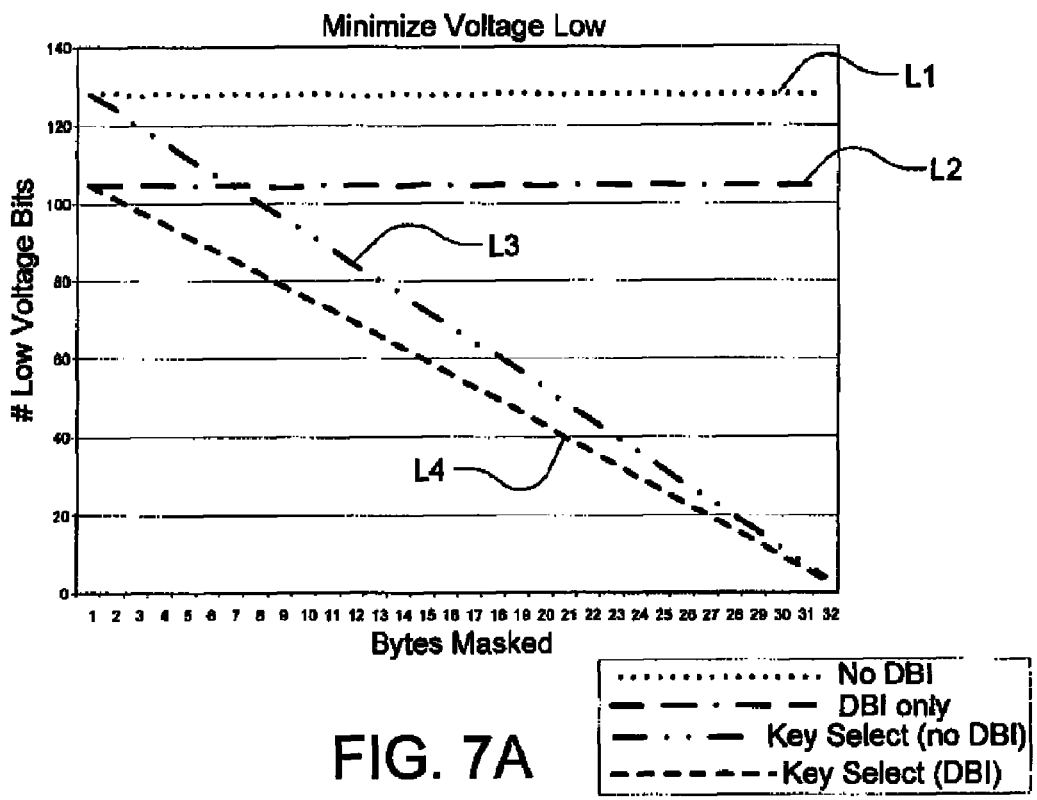
FIG. 7A is a graph showing a performance comparison between various systems.
Figure 7B:
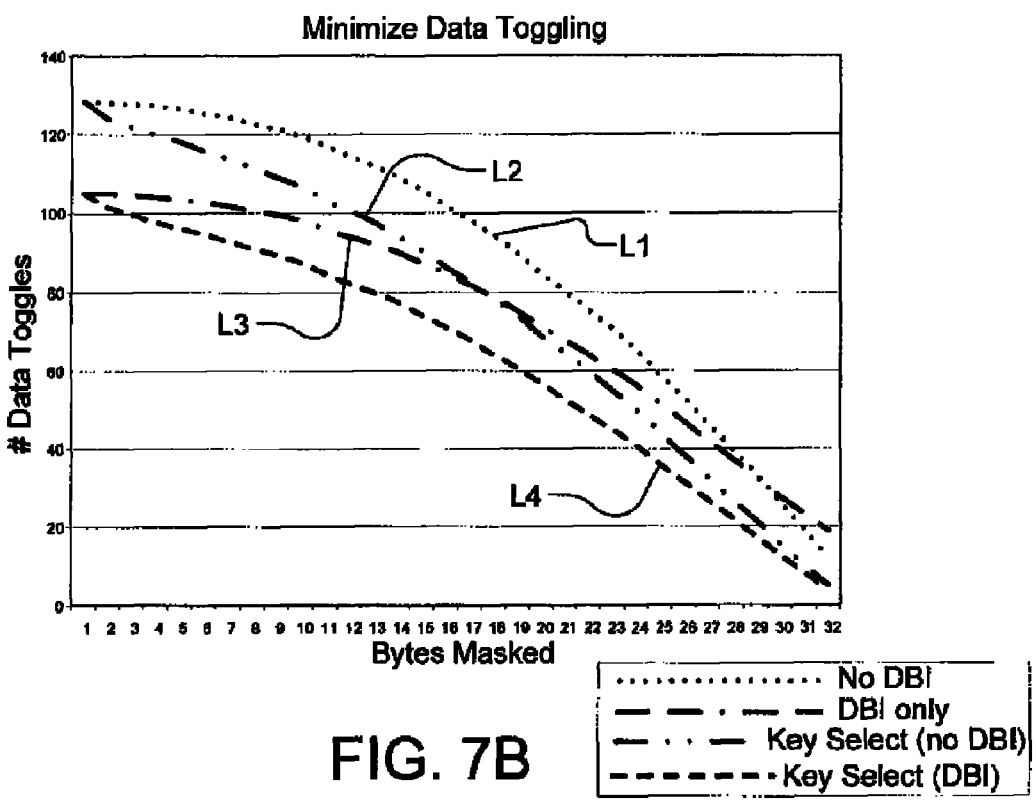
FIG. 7B is a further graph showing a performance comparison between various systems.

FIGS. 7A and 7B respectively illustrated comparative simulations of a mask key selection (a) to minimize low voltage signals and (b) to minimize data toggling. The simulations also compare these systems with and without use of a data bus inversion ("DBI") scheme. In the simulations, blocks of 32 bytes of data are utilized for the simulated transfers for blocks that use from 1 mask key up to 31 mask keys. The plots were based on simulated transfers of 16,000 randomly generated data blocks.

In FIG. 7A, two horizontal lines "L1" and "L2" both represent unprioritized mask key selection; the first line "L1" represents ordinary data transfers while the second line "L2" represents transfers on a bus that utilizes a DBI scheme. FIG. 7A indicates that the number of low voltage bits over the course of transmission is relatively high without key prioritization, but is slightly improved when a DBI scheme is used; in both cases, the two lines are seen in FIG. 7A to be horizontal, meaning that the number of low voltage bits is constant irrespective of the number of masked bytes within any given data block. By contrast, two additional lines "L3" and "L4" represent the use of mask key prioritization to minimize the number of low voltage bits (and thus to aid in minimization of power consumption); the first of these lines "L3" represents mask key selection to minimize power consumption in an ordinary data transmission scheme, while the second of these lines "L4" represents mask key selection to minimize power consumption in an embodiment where a DBI scheme is also used. The second pair of lines "L3" and "L4" have a decreasing slope, indicating that the more bytes within a given data block are masked, the more power may be reduced (e.g., through minimizing the number of zero bits); in the case of a data block where no bytes are masked, there typically is little power savings advantage provided by the use of intelligent mask key selection.

FIG. 7B graphs these implementations in an embodiment where mask keys are selected to minimize driver switching (i.e., data toggles); as with the example above, line "L1" represents no mask key prioritization, line "L2" represents a DBI scheme with no mask key prioritization, line "L3" represents intelligent mask key selection to minimize data toggles, and line "L4" extends the case of line "L3" to a DBI scheme. As with the example of FIG. 7A, the use of intelligent mask key selection according to a power minimization prioritization scheme provides tangible benefits to the illustrated system. Notably, the example of FIG. 7B represents an embodiment where a single mask key is selected and remains unchanged for each entire block of data (e.g., representing median bit values); other embodiments such as that discussed in connection with FIGS. 5 and 6, above (where multiple mask keys may be used depending on last unmasked data and next unmasked data) may provide even greater advantages.

As illustrated in the graphs of 7A and 7B, mask key prioritization of the present technology may improve power transfer characteristics when compared to DBI transfer systems and standard transfer systems. Moreover, a combined implementation of mask key discrimination of the present technology with additional bus encoding, such as DBI, may provide yet further synergistic improvements over other systems.

Figure 8:
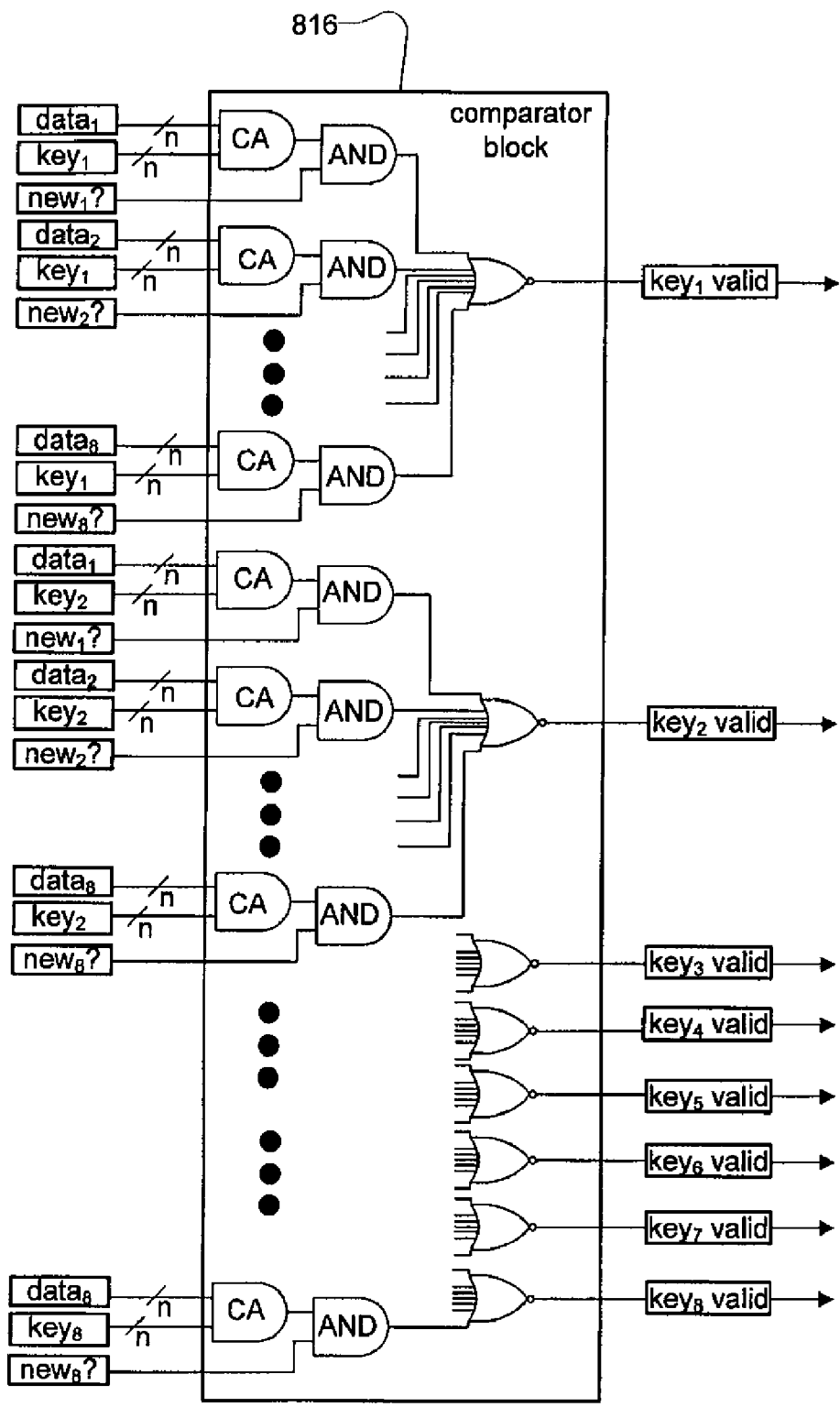
FIG. 8 is a block diagram illustrating an example embodiment of a comparator block; the comparator block may be used in embodiments where unmasked data values are used to screen the set of candidate keys, such that only values that cannot be replicated in unmasked data can be subjected to prioritization and possible instantiation as a mask key for a given data block.

FIG. 8 is a block diagram illustrating an example of a comparator block 816 suitable for use with a mask key selector 212. The function of the comparator block is to compare a set of predetermined possible key values with data block values to detect overlap, and to ensure that any candidate that may be selected as a mask key does not match unmasked data within the data block; as indicated elsewhere in this disclosure, there are embodiments that do not use a comparator block.

FIG. 8 presents an example in which a predetermined pool of eight possible key values are used, and in which a data block consists of a group of eight bytes. It should be recognized that the system may be scaled up for larger blocks and/or block subdivisions or scaled down as desired, and that more than eight predetermined values may be used. In this embodiment, signals representative of each of the values (shown as "$key_1$," "$key_2$," . . . "$key_8$" in FIG. 8) are passed through a succession of three logic gates, including a first AND gate (labeled "CA" in FIG. 8), a second AND gate (labeled "AND" in FIG. 8) and a NOR gate. The first AND gate ("CA") will compare the particular key value with one of the values from the data block (shown as "$data_1$," . . . "$data_8$" in FIG. 4) to be written in a write operation. The output of the first AND gate is then applied to a second AND gate together with a signal indicative of whether or not the particular data block byte is to be left unmasked. These indication signals are labeled in FIG. 8 as "new1?", "new2?", . . . "new8?" For example, in the embodiment depicted in FIG. 8, the "new1?" signal may be high or a "1" bit to indicate that the data of a first byte of data of the block (i.e., $data_1$) is modified and will be left unmasked during the masked write operation. The "New1?" signal may be a low or "0" bit to indicate that that data of the first byte of the block (i.e., $data_1$) is not modified and will be subsequently masked.

The output of each pair of AND gates is then applied to a NOR gate. There is one NOR gate for each possible key choice, and thus, each NOR gate will produce a signal indicative of whether or not the possible choice is a valid candidate key that may be considered for the write operation. For example, a high signal at the output labeled "$key_1$ valid" indicates that the signal of $key_1$ may be used as a candidate key because it is not duplicated in any unmasked data byte of the data block. The collective output of the NOR gates thus represent a set of candidate mask keys that may be considered by the prioritization scheme of a mask key selector. The output of the comparator block of this embodiment may be represented by the following logic equation: comparator block output[i]=

$$\text{not}[(\text{data}[1]==\text{key}[i])\&(\text{new}[1]?==1)+$$

$$(\text{data}[2]==\text{key}[i])\&(\text{new}[2]?==1)+$$

$$(\text{data}[3]==\text{key}[i])\&(\text{new}[3]?==1)+$$

$$\ldots$$

$$(\text{data}[n]==\text{key}[i])\&(\text{new}[n]?==1)];$$

Figure 9:
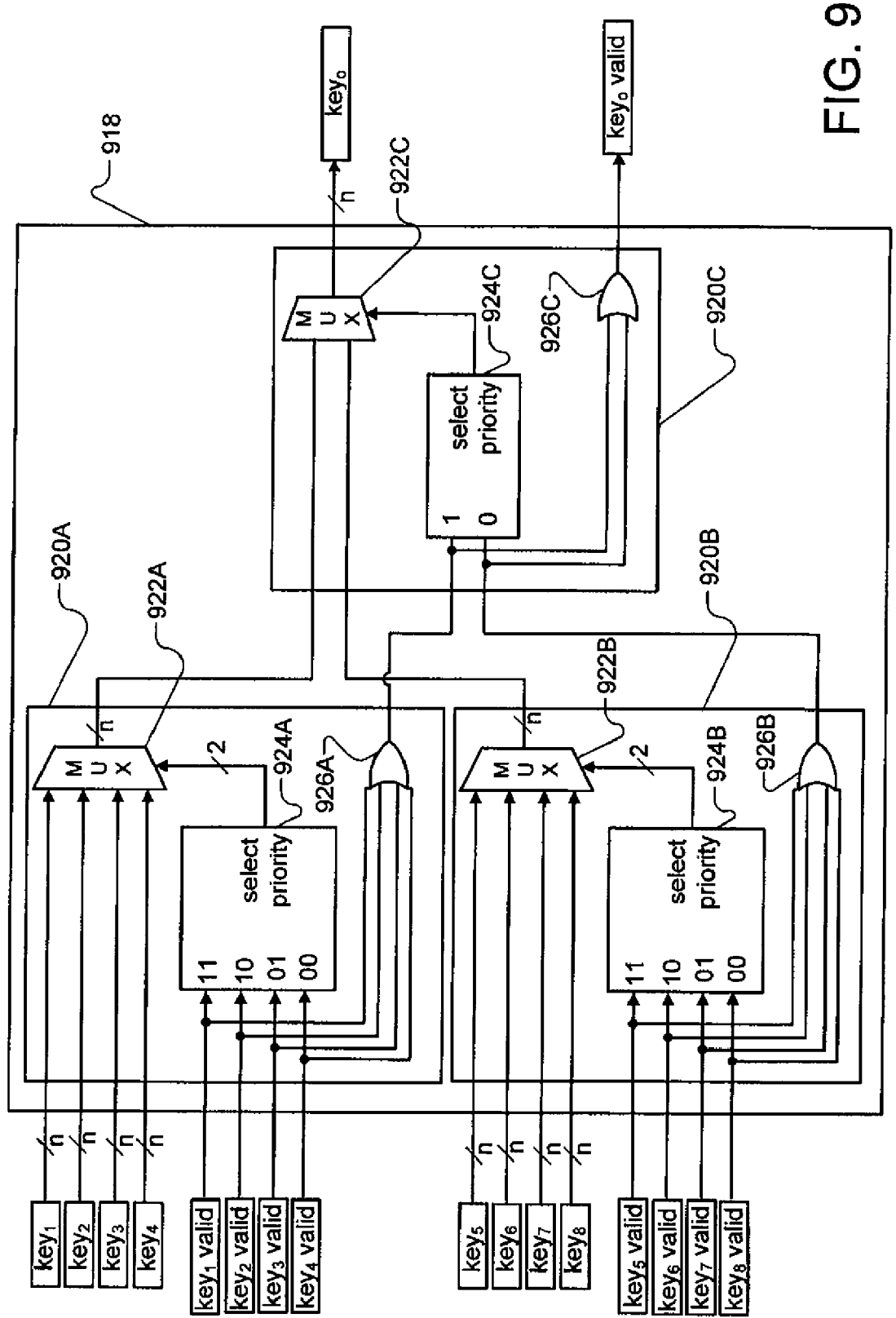
FIG. 9 is a block diagram of a priority encoder block that may be used with the comparator block of FIG. 8; the priority encoder block of FIG. 9 represents a hardware implementation of a scheme that picks a mask key from a set of valid candidates (i.e., not matching any unmasked data values in a given block) and selects a key according to a hardwired prioritization scheme (e.g., to minimize "zero" bits).

FIG. 9 is a block diagram illustrating an example embodiment of a priority encoder block 918 suitable for use with the comparator block 816 illustrated in FIG. 8. In the depicted embodiment, the priority encoder block 918 is a hardware scheme for selecting between predetermined key possibilities to select the particular mask key that will be used according to a hardwired priority scheme. However, it will be recognized that other circuit and/or decision logic gate configurations may be used, and further, that numbers and sizes of subgroups and keys may be scaled up or down depending upon implementation. In FIG. 9, the priority encoder block 918 includes three priority circuits 920A, 920B and 920C that prioritize up to eight predetermined candidate keys. The priority encoder block 918 of FIG. 9 orders these keys from 1 to 8 such that a lower order key (e.g., $key_1$) has a higher priority than a higher order key (e.g., $key_8$), with a key being precluded from selection if its value matches a valid data value (that is, a data value that is not to be masked). The ordering of keys may thus be chosen according to this priority selection as previously described, for example, by selecting $key_1$ to be the candidate with the fewest "high" bits, and by ordering candidate keys in order of increasing number of "low" (or zero) bits. Thus, it should be apparent that such an embodiment may be used to implement a priority scheme which selects a mask key having the fewest "zeroes."

The data bits of the first four candidate keys (shown as "$key_1$," "$key_2$," "$key_3$" and "$key_4$") are applied to a mux 922A such as a 4-to-1 mux, of a first priority circuit. The control of the mux 922A is set to select one of these first four candidate keys based on output of an OR gate 924A. The OR gate 924A will set the control of the mux 922A based on the input of the "valid" output signals of the comparator block (such as the comparator block seen in FIG. 8) associated with the first four keys (i.e., "$key_1$ valid", "$key_2$ valid", "$key_3$ valid", "$key_4$ valid"). For example, the OR gate 924A will set the mux 922A to pass "$key_1$" if the "$key_1$ valid" signal is high. The OR gate 924A will set the mux 922A to pass $key_2$ if the "$key_1$ valid" signal is not high and if "$key_2$ valid" signal is high, and so forth. A low signal from the OR date 926A indicates that none of possible keys 1-4 may be used as candidate keys. Thus, the highest priority key of the first four possible keys will be output of the mux 922A of the first priority circuit 920A.

A second priority circuit 920B is configured to be identical to the first, except that it receives a different set of four keys from the comparator block (shown as "$key_5$," "$key_6$," "$key_7$," and "$key_8$" in FIG. 9) which it may pass to an associated mux 922B and OR gate 926B. As with the example presented above, a low signal from the OR date 926B indicates that none of candidate keys 5-8 are valid. Thus, the highest priority key of the second group of four possible candidates not duplicated by unmasked data will be output of the mux 922B of the second priority circuit 920B.

The output signals of the first and second priority circuits are applied to a second layer priority circuit 920C. Since the number of candidates from the preceding priority circuits is now reduced to a set of at most two in this embodiment, the subsequent layer priority circuit 920C need only prioritize between two candidates, selecting a key from the first group of four keys if the output of the OR gate 926A indicates that one of those keys is a valid candidate, from the second group of four keys if the OR gate 926B indicates that one of those keys a valid candidate (but none of the first four keys are valid candidates). The circuit 924C responsively causes a mux 922C to select between two input values, and an OR gate 924C will indicate whether or not "any key" is a valid candidate. An invalid indication by the OR gate 926C (e.g., a false output signal) indicates that there is no candidate mask key. Although this example prioritization is implemented in layers (e.g., with multiple circuits, depending on the set of predetermined possible mask keys and the number of subdivisions in a data block), the priority encoder block 918 may also be implemented through the use in another manner, such as without tiers, or with different circuits, via firmware, or via some other mechanism.

In the examples illustrated in FIGS. 2, 4 and 8-9, keys are selected (i) by identifying a set of potential mask keys, (ii) by disqualifying values from this set that may not serve as candidate keys, and (iii) by selecting between valid candidates according to the implemented priority scheme. However, other implementations may also select keys without the implementation of the circuit elements or processes for comparison or disqualification. For example, as mentioned, a system may implement reserved mask keys that do not correspond with any data value used in the system (and thus, no comparison need be made with unmasked data values). In an embodiment that implements DBI encoding, for example, potential mask keys may be those byte patterns of data that could not appear on an encoded data bus. For example, in a hypothetical scheme that inverts a data bus to always ensure that no more than four zeros occur, the bits "11100000" would generally not be used as a data signal. Accordingly, if this byte pattern was observed in conjunction with the DBI encoding signal, it could be recognized as a reserved mask key by a receiving memory (i.e., as an impossible data value that must necessarily be a mask key). Thus, a transmitter in this example may select a mask key without having to analyze valid data (or compare possible keys in data that is not-to-be-updated) and a receiver in this example may detect presence of a mask key without comparing received data values to a predetermined key set and without being provided a signal identifying specific mask key identity. In this example, the set of all possible mask keys (e.g., impossible values, or reserved codes such as "00000111", "00000011" etc.) could be used as the potential mask keys and one or more selection criteria as previously discussed may be applied to them to select the mask key. For example, from such a group of candidate keys, a particular mask key may be chosen to reduce switching noise relative to the data block as a whole (as was the subject of FIGS. 7A and 7B). Alternatively, as described above in connection with FIGS. 5 and 6, mask key selection may be made dependent upon another data value in the data block, such as an immediately preceding unmasked value. For example, candidate mask keys may be compared with a previous or subsequent data byte transferred, and any candidate mask key may be selected that minimizes bit toggles or transitions while still yielding an acceptable mask key (e.g., one with five or more zeros in this example). In this manner, selection criteria may be applied to the candidate mask keys that factor in both a power-related end as well as other data in the block of values to determine an appropriate mask key. Other prioritization criteria may also be used.

In another embodiment, criteria-based mask key selection may be implemented with a double transfer block mask key write operation. In such a system, a data block may be transmitted twice, each using a different mask key and without regard to whether a mask key matches any unmasked data values within the block. The first block transfer may include some bytes that have one or more mask keys selected in accordance with any prioritization criteria as previously discussed. The differential values between the two blocks identifying masked subdivisions of data. What this example and the previous example again help illustrate is that in some embodiments, a memory device need not use a comparison function to detect masked data, i.e., a masked sub-group may be detected on context, or for example, by recognition of a code that would not normally be expected.

In general, each of the circuits or elements of each system discussed herein may be realized on one or more integrated chips or one or more integrated circuits. It may be part of the integrated circuits of digital processing devices, computers, computer peripherals, graphics processing devices, etc. For example, the data system may be implemented with multiple integrated circuits such as where the bus implements communications between the distinct integrated circuits. These distinct integrated circuits may even be part of distinct components or modules of a system where the bus between the components or modules is used for transfer of data between the components, such as a bus between a memory module and a memory controller module. However, the data system may also be implemented on a single integrated chip and may be implemented for transmitting data between functional circuit blocks of the integrated chip. For example, the circuits may be implemented as part of a central processing unit or CPU as commonly employed in a digital computer or may be employed as an intermediary between the CPU and other circuit chips. Thus, circuits of the data system as discussed herein can be incorporated in the communication path between a processor such as a CPU and a cache memory. The bus technology may also be implemented as elements of point-to-point connections according to protocols such as PCI Express, Serial ATA and other protocols. By way of further example, the technology may also be implemented in high performance serial links (e.g., backplane links, PCI Gen3 lines, SATA Gen3/4, etc.) The technology can also be used with particular types of bus connections, e.g., arrangements in which the same signal is sent to plural devices connected to the same conductors. The data system can even be implemented for parallel links such as parallel buses or any other device implementing memory operations over parallel communications.

Furthermore, these circuits may be constructed using automated systems that fabricate integrated circuits. For example, the elements and systems described herein may be designed as one or more integrated circuits, or a portion(s) of an integrated circuit, based on design data adapted for use with a circuit-forming apparatus. The circuits may be in the form of data stored in, for example, a physical, computer-readable storage medium such as a magnetic tape or an optical or magnetic disk. The design data or files typically encode data structures or other information or methods describing the circuitry or circuit elements that can be physically created as the elements of the integrated circuits. Although any appropriate format may be used for such encoding, such data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable storage medium. Those of skill in the art of integrated circuit fabrication can then use such encoded data to fabricate integrated circuits comprising one or more of the circuits described herein.

In the foregoing description and in the accompanying drawings, specific terminology and drawing symbols are set forth to provide a thorough understanding of the present technology. In some instances, the terminology and symbols may imply specific details that are not required to practice the technology. For example, although the terms "first" and "second" have been used herein, unless otherwise specified, the language is not intended to provide any specified order or count but merely to assist in explaining elements of the technology.

Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology.

The invention claimed is:

1. A method of mask key selection in a system for storing a group of data to a storage element via a communications link, wherein certain data within the group is to be masked, the method comprising:
from a set of candidate keys, selecting a mask key according to at least one mask key prioritization criterion;
replacing the data to be masked with a mask key selected according to the at least one mask key prioritization criterion, to create a modified group of data; and
transmitting the modified group of data in a masked write operation via the communications link.

2. The method of claim 1 wherein the at least one mask key prioritization criterion prioritizes mask key selection to minimize at least one of power consumption or switching requirements, relative to other keys in the group of candidate keys.

3. The method of claim 1 wherein:
the method further comprises selecting a set of data values;
generating the candidate keys by disqualifying data values within the set based on a match with any data within the group that are to be left unmasked.

4. The method of claim 1 wherein the candidate keys are prioritized in dependence upon at least one datum within the group of data.

5. The method of claim 1 wherein the group of candidate keys includes at least one reserved code that does not overlap with any data within the group of data that are to be left unmasked.

6. A device for a mask key write operation of a group of data, the group of data including data-to-be-updated and data-not-to-be-updated comprising:
a mask key selector to select a mask key for a mask key write operation, each mask key to replace data-not-to-be-updated in a data group, the mask key selector configured to perform a criterion-based selection of at least one mask key from a set of candidate keys;
a mask key write operation controller to generate a mask key write operation using a mask key selected by the mask key selector.

7. The device of claim 6 wherein the mask key selector includes a priority encoder to prioritize a group of mask keys.

8. The device of claim 6 wherein the mask key selector includes a comparator block that compares data values to the group of data to disqualify vales from possible use as mask keys that match data-to-be-updated of the group of data.

9. The device of claim 6 wherein the mask key selector includes prioritizes a selection of a mask key having fewer "0" bits than other mask keys of the group of candidate keys.

10. The device of claim 6 embodied as a memory controller, wherein the mask key write operation controller controls a mask key write operation upon a memory device.

11. The device of claim 6 wherein the mask key selector is configured to select a mask key that minimizes power consumption requirements, relative to other keys in the group of candidate keys.

12. The device of claim 6 wherein the mask key selector is configured to select a mask key that minimizes switching requirements, relative to other keys in the group of candidate keys.

13. The device of claim 6 wherein a single mask key is selected for the group of data and used to replace each instance of data-not-to-be-updated in the group of data.

14. The device of claim 6 wherein multiple mask keys are selected by the mask key selector in dependence upon data within the group of data, and wherein each selected mask key is used to replace at least one instance of data-not-to-be-updated in the group of data.

15. An integrated circuit for controlling a mask key write operation of a group of data, the group of data including data-to-be-updated and data-not-to-be updated, the integrated circuit comprising:
  a key selector to perform a criterion-based selection of a mask key from a set of candidate keys, each selected mask key being used for the mask key write operation; and
  a mask write operation control block to substitute a mask key for each data-not-to-be-updated.

16. The integrated circuit of claim 15 further comprising:
  circuitry that compares data-to-be-updated within the group of data with a predetermined set of data values to determine the group of candidate keys.

17. The integrated circuit of claim 15 wherein the criterion is power-based.

18. The integrated circuit of claim 15 wherein the criterion includes a predetermined relationship to at least one other datum within in the group of data.

19. The integrated circuit of claim 15 wherein the group of candidate keys comprises at least 4 candidate keys.

20. The integrated circuit of claim 15 wherein each candidate key comprises 8 bits.

21. An apparatus comprising a storage medium having machine-readable information thereon, the machine-readable information defining a circuit description, comprising:
  a mask key selector circuit to select a mask key for a mask key write operation of a data group, the data group including data-to-be-updated and data-not-to-be-updated, the mask key to replace data-not-to-be-updated in the data group, the mask key selector configured to make a criteria-based selection of at least one mask key from a group of candidate keys; and
  a mask key write operation controller to generate a mask key write operation with a mask key selected by the mask key selector circuit.

22. The medium of claim 21 wherein the data to form the mask key selector circuit comprise a comparator block circuit to at least compare data-to-be-written of the group of data with a group of data values to select a set of candidate keys adapted for use as mask keys.

23. The medium of claim 21 wherein the data to form the mask key selector circuit comprise a priority encoder, the priority encoder prioritizing the set of candidate keys to determine a mask key for the group of data that represents the candidate key with the maximum number of bits of a specific logic state relative to than other candidate keys.

24. The medium of claim 23 wherein the priority encoder prioritizes the group of potential mask keys to determine a mask key having fewer toggle bits than other mask keys of the group of potential mask keys relative to a preceding data value in the group of data.

25. A system for a mask key write operation with a group of data including data-to-be-updated and data-not-to-be-updated, the system comprising:
  mask key selection means for generating a mask key with a criterion-based selection of the mask key from a set of candidate keys; and
  means for replacing data-not-to-be-written of the group of data using at least one mask key selected by the mask key selection means.

26. The system of claim 25 further comprising external bus means for signaling the group of data with a selected mask key and data-to-be-updated between transmitters and receivers of different integrated chips.

27. The system of claim 26 wherein:
  the mask key selection means comprises at least a portion of a memory controller; and
  the system further comprises a dynamic random access memory controlled by the memory controller.

* * * * *